(12) United States Patent
Lu et al.

(10) Patent No.: US 11,021,133 B2
(45) Date of Patent: Jun. 1, 2021

(54) THEFT DETERRENT SYSTEM FOR CONNECTED VEHICLES BASED ON WIRELESS MESSAGES

(71) Applicant: TOYOTA JIDOSHA KABUSHIKI KAISHA, Toyota (JP)

(72) Inventors: Hongsheng Lu, Mountain View, CA (US); Gaurav Bansal, Mountain View, CA (US); John Kenney, Mountain View, CA (US)

(*) Notice: Subject to any disclaimer, the term of this patent is extended or adjusted under 35 U.S.C. 154(b) by 75 days.

(21) Appl. No.: 15/921,404

(22) Filed: Mar. 14, 2018

(65) Prior Publication Data

US 2019/0283709 A1 Sep. 19, 2019

(51) Int. Cl.
| | |
|---|---|
| H04N 7/18 | (2006.01) |
| B60R 25/102 | (2013.01) |
| B60R 25/30 | (2013.01) |
| H04W 4/40 | (2018.01) |
| B60R 25/10 | (2013.01) |

(52) U.S. Cl.
CPC .......... B60R 25/102 (2013.01); B60R 25/305 (2013.01); H04N 7/183 (2013.01); H04N 7/188 (2013.01); H04W 4/40 (2018.02); B60R 2025/1016 (2013.01); B60R 2325/205 (2013.01)

(58) Field of Classification Search
None
See application file for complete search history.

(56) References Cited

U.S. PATENT DOCUMENTS

| | | | | |
|---|---|---|---|---|
| 9,767,675 | B2* | 9/2017 | Hutchings | G08G 1/096791 |
| 10,117,173 | B2* | 10/2018 | Garg | H04W 52/0206 |
| 10,210,762 | B1* | 2/2019 | Dotzler | G08G 1/205 |
| 10,380,886 | B2* | 8/2019 | Ran | H04L 67/00 |
| 2003/0151500 | A1* | 8/2003 | Mitsui | B60R 25/33 340/426.1 |
| 2017/0205825 | A1* | 7/2017 | Wang | B60W 30/18154 |
| 2018/0037193 | A1* | 2/2018 | Penilla | H04N 7/181 |
| 2018/0201227 | A1* | 7/2018 | Gao | B60R 25/305 |
| 2018/0218582 | A1* | 8/2018 | Hodge | G06Q 40/08 |

OTHER PUBLICATIONS

Autotalks DSRC technology, © 2019 Autotalks Ltd. All Rights Reserved. | Website by: wordpress factory; https://www.auto-talks.com/technology/dsrc-technology/ (Year: 2019).*

* cited by examiner

*Primary Examiner* — Shadan E Haghani
(74) *Attorney, Agent, or Firm* — Burbage Law, P.C.; Jon-Michael Burbage; Elizabeth Ruzich

(57) ABSTRACT

The disclosure includes embodiments for theft deterrent for a connected vehicle using Basic Safety Message (BSM)-based Vehicle-to-Anything (V2X) communication. In some embodiments, a method includes receiving, by a V2X radio, a wireless message that is transmitted by a first connected vehicle whose ignition is disengaged. In some embodiments, the method includes determining, based on a payload of the wireless message, that the first connected vehicle is being subjected to criminal activity. In some embodiments, the method includes taking a remedial action responsive to determining that the first connected vehicle is being subjected to criminal activity. In some embodiments, the remedial action is operable to deter the occurrence of the criminal activity (i.e., stop the first connected vehicle from being stolen) or gather visual evidence of the criminal activity.

20 Claims, 7 Drawing Sheets

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4

BSM DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)
Data indicating whether the vehicle is being stolen.

Figure 5

THEFT DETERRENT SYSTEM FOR CONNECTED VEHICLES BASED ON WIRELESS MESSAGES

BACKGROUND

The specification relates to a theft deterrent system for connected vehicles that is based on wireless messages that are transmitted by a vehicle. In some embodiments, the wireless messages include a Basic Safety Message ("BSM" if singular, "BSMs" if plural) that is transmitted by a vehicle that is being subjected to criminal activity, including theft and other criminal activity.

According to the Insurance Information Institute, about $5.9 billion was lost to vehicle theft in 2016. The average dollar loss per theft was $7,680. Vehicles were stolen at a rate of 236.9 per 100,000 people in 2016, up 7.6 percent from 2015.

SUMMARY

Vehicle theft is an ongoing problem. Modern vehicles are generally equipped with: (1) a Vehicle-to-Anything (V2X) radio; (2) a car alarm system; and (3) one or more onboard external cameras. Described herein are embodiments of a deterrent system that includes software which is installed in the V2X radio and car alarm system of a connected vehicle. In some embodiments, the V2X radio is a Dedicated Short-Range Communication (DSRC) radio. A vehicle that includes a V2X radio is a connected vehicle because it is operable to send and receive wireless messages via a wireless network. A car alarm system may be referred to herein as an "alarm system."

In some embodiments, the deterrent system is operable to provide one or more of the following example benefits: reducing vehicle theft; improving the performance of a car alarm system; and reducing the cost of manufacturing car alarm systems by connecting multiple vehicles through BSM-based V2X communications whenever a vehicle theft or suspicious circumstance is detected by the deterrent system.

Vehicles that are equipped with DSRC radios transmit a BSM at a periodic interval (e.g., once every 0.10 seconds or some other time interval which is user-configurable, or configurable by the deterrent system whenever the vehicle is parked). BSMs include a payload that consists of BSM data. BSM data is digital data that describes, among other things, one or more of the following: the path history of the vehicle which transmits the BSM; a geographic location of the transmitting vehicle with an accuracy of plus or minus 1.5 meters relative to the actual location of the transmitting vehicle; and a heading or trajectory of the transmitting vehicle. BSM data is described in more detail below with reference to FIGS. 4 and 5.

The deterrent system is now described according to some embodiments with reference to an ego vehicle which includes the deterrent system. Assume the ego vehicle includes the following elements: (1) a V2X radio; (2) an alarm system; (3) one or more onboard external cameras; (4) a notification system; and (5) a response system.

In some embodiments, the notification system and the response system are both software that are operable, when executed by an onboard vehicle computer system of the vehicle, to cause the onboard vehicle computer system to provide some or all of the functionality described herein with reference to the deterrent system. For example, the notification system and the response system are operable, when executed by the onboard vehicle computer system, to cause the onboard vehicle computer system to execute one or more of the steps described below with reference to FIGS. 3A and 3B.

In some embodiments, the V2X radio is modified so that it includes the notification system. The alarm system is modified so that it includes the response system.

In some embodiments, the notification system causes the V2X radio to ping the alarm system periodically. If everything is fine, the response system pings back with "OK" or some other message that indicates that everything is fine. Otherwise, the response system either: (1) responds with some other message (e.g., "help" or some other similar message); or (2) does not respond (e.g., because the alarm system has been disabled). If either (1) or (2) occur, the notification system determines that illegal activity is occurring. The notification system then takes remedial action by causing the DSRC radio to transmit BSMs which notify other vehicles, smartphones or other DSRC-equipped devices which are nearby and within wireless range (e.g., DSRC range) that their assistance is needed. This assistance can take several different forms.

For example, the vehicles which receive the BSM indicating a vehicle theft is occurring may each individually trigger their car alarms at the same time, which will result in a loud noise and flashing lights that causes neighbors to look out their window and observe the vehicle theft as it occurs.

In another example, the vehicles that receive the BSM indicating that a vehicle theft is occurring may each activate their onboard external cameras so that they collect images and video of the theft as it occurs. These videos may be transmitted to the police (at the option of the owner of each vehicle).

In yet another example, the BSM indicating that a vehicle theft is occurring may be received by the smartphones of different people (e.g., the owner of the vehicle, neighbors, etc.), which may display a message describing the theft and possibly images of the theft as it is occurring.

In some embodiments, a neighborhood includes several parked vehicles that are equipped with DSRC radios at any given time, as well as several smartphones or other electronic consumer devices which also include DSRC radios.

Ordinarily a DSRC radio transmits a BSM at a regular interval such as once every 0.10 seconds while the ego vehicle is powered on or otherwise in use by a driver. Other V2X radios may also be programmed to provide similar functionality to a DSRC radio by transmitting a BSM at a regular interval such as once every 0.10 seconds, and so, the deterrent system described herein is not limited to only working with a DSRC radio. An interval of once every 0.10 seconds is a short interval, but this short interval is necessary when the ego vehicle is in use by the driver (e.g., being driven down a roadway) since the BSMs update other DSRC-equipped vehicles about the past, current and future condition of the ego vehicle, thereby reducing collisions and increasing driver safety. However, this short interval is not needed when an ego vehicle is not in use (e.g., parked in a driveway with the ignition disengaged), and has serious negative consequences because it drains the ego vehicle's battery. Industry standards require the battery of a parked vehicle maintain sufficient charge to start the vehicle after 14 days of non-use. This standard cannot be met when a DSRC radio is powered on 24 hours a day and transmitting BSMs at a normal rate of about once every 0.10 seconds. Because of this, DSRC radios are normally powered off when the vehicle is not in use by the driver. This is also true of other V2X radios, and not just DSRC radios.

In some embodiments, the deterrent system uses a V2X radio (e.g., a DSRC radio) while the ego vehicle is parked with the ignition disengaged, and so the V2X radio needs to be powered on while the ego vehicle is not in use by the driver. This creates a battery drainage problem. To solve this problem, embodiments of the notification system include software installed in the DSRC radio that provides the following functionality when executed by an onboard vehicle computer of the ego vehicle: (1) keeping the V2X radio powered on while the vehicle is not in use; (2) preventing battery drainage below acceptable standards by modifying the power needs of the DSRC radio by temporarily decreasing the transmission rate of BSMs transmitted by the DSRC radio from once every 0.10 seconds to once every three to five seconds while the ego vehicle is parked with its ignition disengaged, and then increasing the transmission rate to the default setting (e.g., once every 0.10 seconds) once the ego vehicle is powered on by the driver; and (3) providing a notification to neighboring vehicles (e.g., via BSM) when the ego vehicle is going to disengage (e.g., because of a low battery level or because an authorized user having the key or key-fob disables the alarm system). This disengagement notification helps the neighboring vehicles from falsely thinking that the ego vehicle which includes the notification system is being subjected to criminal activity. In some embodiments, a criminal activity includes the vehicle being stolen, robbed, vandalized or otherwise the subject of a crime as determined by an alarm system of the vehicle A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a V2X radio, a wireless message that is transmitted by a first connected vehicle whose ignition is disengaged; determining, based on a payload of the wireless message, that the first connected vehicle is being subjected to criminal activity; and taking a remedial action responsive to determining that the first connected vehicle is being subjected to criminal activity. Other embodiments of this aspect include corresponding computer systems, apparatus, and computer programs recorded on one or more computer storage devices, each configured to perform the actions of the methods.

Implementations may include one or more of the following features. The method where the wireless message is a DSRC message and the payload is compliant with the DSRC standard. The method where the DSRC message is not one of the following: a WiFi message; a 3G message; a 4G message; a Long-Term Evolution (LTE) message; a millimeter wave communication message; a Bluetooth message; and a satellite communication. The method where the V2X radio is an element of a second connected vehicle and the remedial action includes triggering an alarm system of the second connected vehicle so that the alarm system activates provides a notification that the first connected vehicle is being subjected to criminal activity. The method where the notification includes one or more of honking a horn of the second connected vehicle and flashing headlamps of the second connected vehicle. The method where a group of second connected vehicles receive the wireless message such that the group of second connected vehicles activate their alarm systems and simultaneously provide the notification that the first connected vehicle is being subjected to criminal activity. The method where the second connected vehicle is parked and its ignition is disengaged. The method where the V2X radio is an element of a second connected vehicle and the remedial action includes activating one or more onboard external cameras of the second connected vehicle so that one or more of images and video of the first connected vehicle being stolen. The method where a group of second connected vehicles receive the wireless message such that the group of second connected vehicles activate their onboard external cameras and simultaneously record one or more of images and video of the first connected vehicle being stolen from various points of view. The method where the one or more of the images and the video are wirelessly transmitted to a connected device that is operated by a law enforcement agency. The method where the V2X radio is an element of a smartphone and the remedial action includes displaying a notification on the smartphone that includes one or more of the following: a message indicating that the first connected vehicle is being subjected to criminal activity; and one or more images of the first connected vehicle being stolen. Implementations of the described techniques may include hardware, a method or process, or computer software on a computer-accessible medium.

One general aspect includes a system including: a processor communicatively coupled to a V2X radio and non-transitory memory, where the V2X radio is operable to receive a wireless message that is transmitted by a first connected vehicle whose ignition is disengaged and the non-transitory memory stores computer code that is operable, when executed by the processor, to cause the processor to: determine, based on a payload of the wireless message, that the first connected vehicle is being subjected to criminal activity; and take a remedial action responsive to determining that the first connected vehicle is being subjected to criminal activity. Other embodiments of this aspect include corresponding computer systems, apparatus, and computer programs recorded on one or more computer storage devices, each configured to perform the actions of the methods.

Implementations may include one or more of the following features. The system where the V2X radio is an element of a second connected vehicle and the remedial action includes triggering an alarm system of the second connected vehicle so that the alarm system activates provides a notification that the first connected vehicle is being subjected to criminal activity. The system where the notification includes one or more of honking a horn of the second connected vehicle and flashing headlamps of the second connected vehicle. The system where a group of second connected vehicles receive the wireless message such that the group of second connected vehicles activate their alarm systems and simultaneously provide the notification that the first connected vehicle is being subjected to criminal activity. The system where the second connected vehicle is parked and its ignition is disengaged. The system where the V2X radio is an element of a second connected vehicle and the remedial action includes activating one or more onboard external cameras of the second connected vehicle so that one or more of images and video of the first connected vehicle being stolen. The system where a group of second connected vehicles receive the wireless message such that the group of second connected vehicles activate their onboard external cameras and simultaneously record one or more of images and video of the first connected vehicle being stolen from various points of view. The system where the V2X radio is an element of a smartphone and the remedial action includes displaying a notification on the smartphone that includes one or more of the following: a message indicating that the first connected vehicle is being subjected to criminal activity; and one or more images of the first connected vehicle being stolen. Implementations of the described techniques may include hardware, a method or process, or computer software on a computer-accessible medium.

One general aspect includes a computer program producing comprising instructions that, when executed by one or more processors, cause the one or more processors to perform operations comprising: receiving a wireless message that is transmitted by a first connected vehicle whose ignition is disengaged; determining, based on a payload of the wireless message, that the first connected vehicle is being subjected to criminal activity; and taking a remedial action responsive to determining that the first connected vehicle is being subjected to criminal activity. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of Basic Safety Message (BSM) data according to some embodiments.

DETAILED DESCRIPTION

Figure 1A:
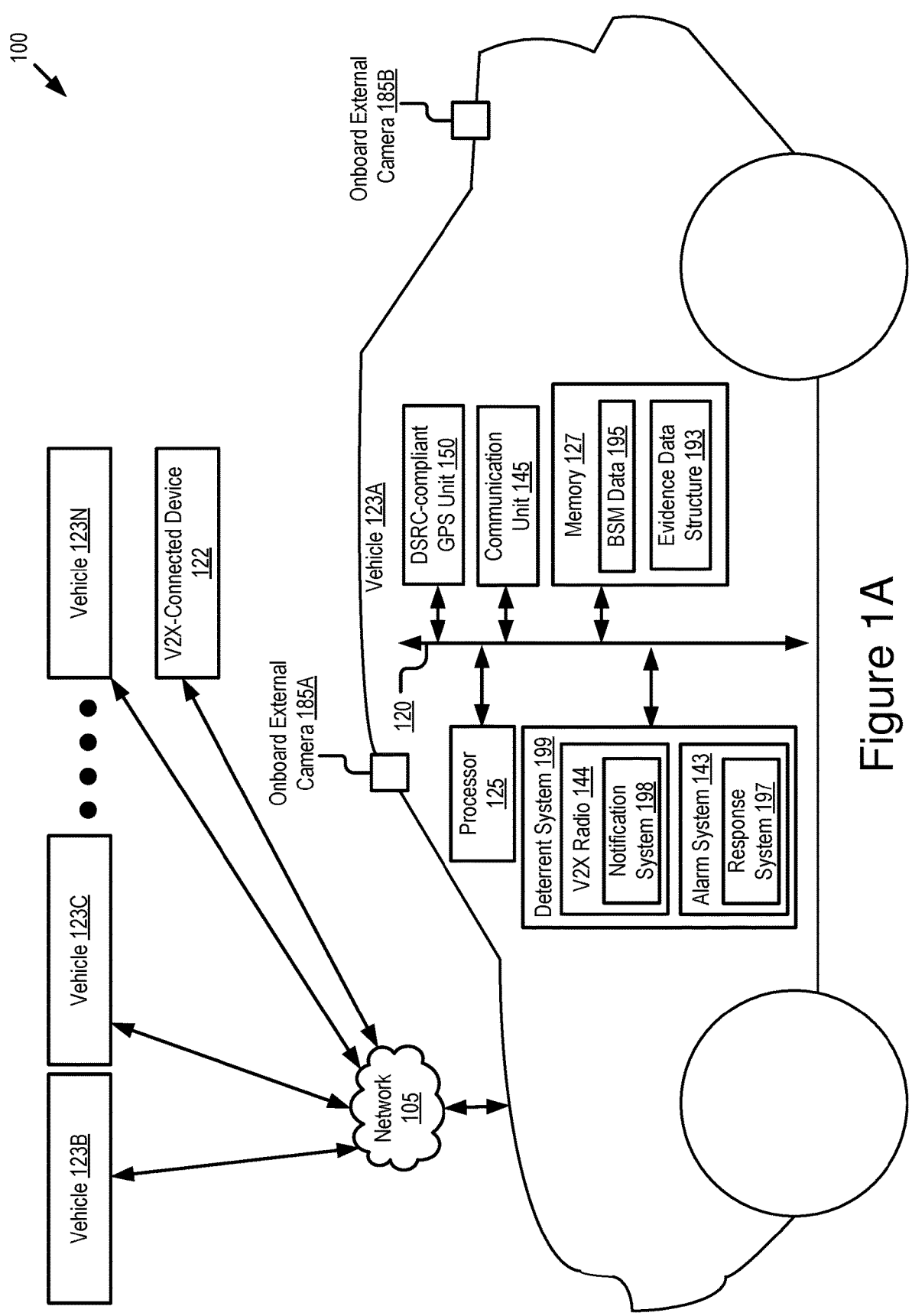
FIG. 1A is a block diagram illustrating an operating environment for a deterrent system according to some embodiments.

Embodiments of a deterrent system that is operable to deter criminal activity in relation to a connected vehicle using BSM-based V2X communication are described. Examples of V2X communication include one or more of the following: DSRC; LTE; millimeter wave communication; 3G; 4G; 5G LTE-Vehicle-to-Anything (LTE-V2X); LTE-Vehicle-to-Vehicle (LTE-V2V); LTE-Device-to-Device (LTE-D2D); Voice over LTE (VoLTE); etc.

In some embodiments, the vehicle that includes the deterrent system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 4 and 5 depict examples of a permissible payload for a particular type of DSRC message referred to as a BSM message. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1A, depicted is an operating environment 100 for a deterrent system 199 according to some embodiments. As depicted, the operating environment 100 includes the following elements: vehicles 123A, 123B, 123C . . . 123N (referred to herein collectively or individually as "vehicle 123" or "the vehicles 123); and a V2X connected device 122. These elements are communicatively coupled to one another by a network 105.

In some embodiments, the V2X connected device 122 includes a human user (not pictured). "N" as used with reference to the vehicle 123N indicates that there can be any positive whole number of vehicles 123 that is greater than one. In some embodiments, the vehicle 123A is referred to as an "ego vehicle 123A" and the vehicles 123B, 123C . . . 123N are referred to as "remote vehicles 123."

Although one V2X-connected device 122 and one network 105 are depicted in FIG. 1A, in practice the operating environment 100 may include one or more V2X-connected devices 122 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

The following are endpoints of the network 105: the vehicles 123; and the V2X-connected device 122. In some embodiments, each of the vehicles 123 include an instance of the deterrent system 199. The deterrent systems 199 cooperate with one another via the network 105 to provide a deterrent service to the vehicles 123, and thereby decrease the likelihood that one of the vehicles 123 will be stolen.

The vehicle 123 is any type of connected vehicle. For example, the vehicle 123 is one of the following types of vehicles: a car; a truck; a sports utility vehicle; a bus; a semi-truck; a robotic car; a drone or any other roadway-based conveyance. In some embodiments, the vehicle 123 is a DSRC-equipped vehicle.

In some embodiments, the vehicle 123 is an autonomous vehicle or a semi-autonomous vehicle. For example, the vehicle 123 includes a set of Advanced Driver Assistance Systems (a set of "ADAS systems") which provide autonomous features to the vehicle 123 which are sufficient to render the vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control. The set of ADAS systems may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle 123 includes the following elements: a processor 125; a memory 127; a communication unit 145; a DSRC-compliant GPS unit 150; a first onboard external camera 185A and a second onboard external camera 185B (which are referred to collectively or individually as the "onboard external camera 185"); and a deterrent system 199 including a V2X radio 144 and an alarm system 143. The V2X radio 144 includes a notification system 198 and the alarm system 143 includes a response system 197. These elements of the vehicle 123 are communicatively coupled to one another via a bus 120. Although the vehicle 123 is depicted as including two onboard external cameras 185, in practice the vehicle 123 may include one or more onboard external cameras 185, or optionally no onboard external cameras 185.

In some embodiments, the processor 125 and the memory 127 may be elements of an onboard vehicle computer system (such as computer system 200 described below with reference to FIG. 2). The onboard vehicle computer system may be operable to cause or control the operation of the deterrent system 199 of the vehicle 123. The onboard vehicle computer system may be operable to access and execute the data stored on the memory 127 to provide the functionality described herein for the deterrent system 199 of the vehicle 123 or its elements (see, e.g., FIG. 2). The onboard vehicle computer system may be operable to execute the deterrent system 199 which causes the onboard vehicle computer system to execute one or more steps of one or more of the method 300 described below with reference to FIGS. 3A and 3B.

In some embodiments, the processor 125 and the memory 127 may be elements of an onboard unit. The onboard unit includes an electronic control unit (herein "ECU") or an onboard vehicle computer system that may be operable to cause or control the operation of the deterrent system 199. The onboard unit may be operable to access and execute the data stored on the memory 127 to provide the functionality described herein for the deterrent system 199 or its elements. The onboard unit may be operable to execute the deterrent system 199 which causes the onboard unit to execute one or more steps of one or more of the method 300 described below with reference to FIGS. 3A and 3B. In some embodiments, the computer system 200 depicted in FIG. 2 is an example of an onboard unit.

In some embodiments, the DSRC-compliant GPS unit 150 includes any hardware and software necessary to make the vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the vehicle 123 with lane-level accuracy. For example, the vehicle 123 is traveling in a lane of a roadway. Lane-level accuracy means that the location of the vehicle 123 is described by the GPS data so accurately that the vehicle's 123 lane of travel within the roadway may be accurately determined based on the GPS data for this vehicle 123 as provided by the DSRC-compliant GPS unit 150. In some embodiments, the GPS data is an element of the BSM data 195 (see, e.g., FIGS. 4 and 5).

In some embodiments, the DSRC-compliant GPS unit 150 includes hardware that wirelessly communicates with a GPS satellite to retrieve GPS data that describes the geographic location of the vehicle 123 with a precision that is compliant with the DSRC standard. The DSRC standard requires that GPS data be precise enough to infer if two vehicles (one of which is, for example, the vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the deterrent system 199 described herein may analyze the GPS data provided by the DSRC-compliant GPS unit 150 and determine what lane the vehicle 123 is traveling in based on the relative positions of two or more different vehicles (one of which is, for example, the vehicle 123) traveling on the roadway at the same time.

By comparison to the DSRC-compliant GPS unit 150, a conventional GPS unit which is not compliant with the DSRC standard is unable to determine the location of a vehicle 123 with lane-level accuracy. For example, a typical roadway lane is approximately 3 meters wide. However, a conventional GPS unit only has an accuracy of plus or minus 10 meters relative to the actual location of the vehicle 123. As a result, such conventional GPS units are not sufficiently accurate to identify a lane of travel for a vehicle 123 based on GPS data alone; instead, systems having only conventional GPS units must utilize sensors such as cameras to identify the vehicle's 123 lane of travel. Identifying a lane of travel of a vehicle is beneficial, for example, because in some embodiments it may enable the deterrent system 199 to more accurately identify a stolen vehicle 123 among one or more other vehicles that are on a roadway at the same time in the same general vicinity as the stolen vehicle 123.

In some embodiments, the vehicle 123 may include a sensor set. The sensor set may include one or more sensors that are operable to measure the physical environment outside of the vehicle 123. For example, the sensor set may include one or more sensors that record one or more physical characteristics of the physical environment that is proximate to the vehicle 123. The memory 127 may store sensor data that describes the one or more physical characteristics recorded by the sensor set. The sensor data may be used by the deterrent system 199 to gather evidence about a stolen vehicle. The sensor data is stored in the evidence data structure 193. The onboard external cameras 185 are an element of the sensor set. Although not depicted as such in FIG. 1A, in some embodiments the onboard external cameras 185 are communicatively coupled to the bus 120 so that their sensor data is stored in the evidence data structure 193 of the memory 127.

In some embodiments, the sensor set of the vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a nonvolatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

The memory 127 of the vehicle 123 stores one or more of the following types of digital data: BSM data 195; GPS data; and an evidence data structure 193.

In some embodiments, the memory 127 stores, as digital data, any data described herein. In some embodiments, the memory 127 stores any data that is necessary for the deterrent system 199 to provide its functionality.

The BSM data 195 is digital data that is received in a BSM message or transmitted in a BSM message. The BSM data 195 is depicted in FIGS. 4 and 5. The BSM data 195 is described in more detail below with reference to FIGS. 4 and 5. In some embodiments, the memory 127 stores DSRC data which is digital data received in a DSRC message or transmitted as a DSRC message. The DSRC data describes any information that is included in the BSM data 195. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

The evidence data structure 193 includes sensor data that are recorded by the onboard sensors of the vehicle 123. In some embodiments, the evidence data structure 193 is a database or some other data structure that stores sensor data that describes images or video recorded by the onboard external cameras 185 of the vehicle 123.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 is a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes a transmitter and a receiver that is operable to send and receive wireless messages via any V2X protocol. For example, the V2X radio 144 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 144 includes a non-transitory memory which stores digital data that controls the frequency for broadcasting BSM messages. In some embodiments, the non-transitory memory stores a buffered version of the GPS data for the vehicle 123 so that the GPS data for the vehicle 123 is broadcast as an element of the BSMs which are regularly broadcast by the V2X radio 144.

In some embodiments, the V2X radio 144 includes any hardware or software which is necessary to make the vehicle 123 compliant with the DSRC standards. In some embodiments, the DSRC-compliant GPS unit 150 is an element of the V2X radio 144.

The deterrent system 199 includes software that is operable to leverage the V2X radio 144 to improve the operation of the alarm system 143 using the BSMs that the V2X radio 144 regularly transmits. In this way the deterrent system 199 includes software that is operable to provide theft deterrence of the vehicle 123 using BSM-based V2X communication.

In some embodiments, the deterrent system 199 includes the V2X radio 144 and the alarm system 143.

The V2X radio 144 includes hardware and software which enable the vehicle 123 to send and receive BSMs. In some embodiments, the notification system 198 is stored in a non-transitory memory of the V2X radio 144 (e.g., a flash memory or a buffer) and executed by the processor 125 or onboard vehicle computer system of the vehicle 123, or the V2X radio 144 itself if the V2X radio 144 includes a processor such as the processor 125. The notification system 198 is described herein as being executed by the processor 125, but in practice the notification system 198 is executed by any processor similar to the processor 125, an onboard vehicle computer system, an onboard unit, an ECU or some other processor-based computing device of the vehicle 123. In some embodiments, the notification system 198 includes code and routines that are operable, when executed by a processor 125 of the vehicle 123, to cause the processor 125 to execute one or more of the steps described below with reference to the method 300 of FIGS. 3A and 3B.

The alarm system 143 includes hardware and software which are operable to detect whether the vehicle 123 is being subjected to criminal activity. In some embodiments, the alarm system 143 is a conventional car alarm system which is modified to include the response system 197. The response system is software written by the inventors. In some embodiments, the response system 197 is stored in a non-transitory memory of the alarm system 143 (e.g., a flash memory or a buffer) and executed by the processor 125 or onboard vehicle computer system of the vehicle 123, or the alarm system 143 itself if the alarm system 143 includes a processor such as the processor 125. The response system 197 is described herein as being executed by the processor 125, but in practice the response system 197 is executed by any processor similar to the processor 125, an onboard vehicle computer system, an onboard unit, an ECU or some other processor-based computing device of the vehicle 123. In some embodiments, the response system 197 includes code and routines that are operable, when executed by a processor 125 of the vehicle 123, to cause the processor 125 to execute one or more of the steps described below with reference to the method 300 of FIGS. 3A and 3B.

In some embodiments, one or more of the notification system 198 and the response system 197 of the vehicle 123 are implemented using hardware including a field-programmable gate array ("FPGA") or an application-specific integrated circuit ("ASIC"). In some other embodiments, one or more of the notification system 198 and the response system 197 of the vehicle 123 are implemented using a combination of hardware and software.

The onboard external cameras 185 are onboard cameras of the vehicle 123. In some embodiments, the onboard external cameras 185 are high definition cameras. In some embodiments, the onboard external cameras 185 include servo motors that are operable to reconfigure the viewing angle of the onboard external cameras. For example, the onboard external cameras 185 are operable to pan up, pan down or pan side-to-side in order to capture particular images in particular places.

In some embodiments, the notification system 198 includes code and routines that are operable, when executed by the processor 125, to cause the V2X radio 144 to ping the alarm system 143 periodically. For example, the notification system 198 pings the alarm system 143 to determine whether the vehicle 123 is presently being subject to criminal activity based on the determination of the alarm system 143. The pings described herein are transmitted, for example, via the bus 120. A criminal activity includes one or more of the vehicle 123 being stolen, robbed, vandalized or otherwise the subject of a crime as determined by the alarm system 143.

In some embodiments, the response system 197 includes hooks in the software or hardware of the alarm system 143 that enables the response system 197 to determine whether the alarm system 143 has detected activity that the alarm system 143 has determined to indicate that the vehicle 123 is presently being subjected to criminal activity. For example, the circuitry of the alarm system 143 exchanges signals that indicate a present crime state of the vehicle 123 and the response system 197 includes hooks that are operable to read these signals and determine the present crime state of the vehicle 123 as determined by the alarm system 143. The present crime state of the vehicle 123 describes whether the vehicle 123 is presently being stolen, robbed, vandalized or otherwise the subject of a crime as determined by the alarm system 143. In another example, the alarm system 143 determines the present crime state of the vehicle 123 on a periodic basis and transmits electronic messages to the response system 197 that describe the present crime state of the vehicle 123.

The response system 197 of the alarm system 143 receives the ping from the notification system 198. The response system 197 determines the present crime state of the vehicle 123 and responds to the ping with an electronic message that describes whether a crime relating to the vehicle 123 is presently occurring.

In some embodiments, if the crime state indicates that a crime relating to the vehicle 123 is not presently occurring, the response system 197 pings back to the notification system 198 with "OK" or some other electronic message which is known by the notification system 198 to indicate that the vehicle 123 is not presently being stolen, robbed, vandalized or otherwise the subject of a crime.

In some embodiments, if the crime state indicates that a crime relating to the vehicle 123 is presently occurring, the response system 197 either: (1) pings back to the notification system 198 with an electronic message which indicates that a crime is occurring (e.g., "help"); or (2) does not respond at all (e.g., because the car alarm system has been disabled). If either (1) or (2) occur, the notification system 198 determines that illegal activity is occurring. The notification system 198 then takes remedial action by causing the V2X radio 144 to transmit BSMs which notify other vehicles 123 or one or more V2X-connected devices 122 which are nearby and within V2X range (e.g., DSRC range which is described below with reference to FIGS. 4 and 5) that their assistance is needed. For example, an ego vehicle 123A broadcasts a BSM that is received by remote vehicles 123 (or optionally the V2X-connected device 122). The remote vehicles include, for example, the second vehicle 123B, the third vehicle 123C . . . and the Nth vehicle 123N. These remote vehicles 123 include their own instance of the deterrent system 199. The deterrent system of these remote vehicles 123 (or optionally the V2X-connected device 122) receive the BSM broadcast by the ego vehicle 123A which is subject to the criminal activity and take remedial action to assist the ego vehicle 123A (and thereby improve the performance and operation of the alarm system 143 of the ego vehicle 123A) by taking remedial action. This remedial action can take several different forms as described below.

For example, the remote vehicles 123 which receive the BSM indicating that the ego vehicle 123A is being subjected to criminal activity individually trigger their alarm systems 143 at the same time (or contemporaneously), thereby resulting in a loud noise and flashing lights that cause neighbors to look out their window and observe the criminal activity as it occurs. The criminals perpetrating the criminal activity may then take flight so that the financial loss to the owner or operator of the ego vehicle 123A is minimized or eliminated.

In another example of remedial action, the remote vehicles 123 that receive the BSM that the ego vehicle 123A is being subjected to criminal activity each activate their onboard external cameras 185A, 185B . . . 185N so that they collect images or video of the criminal activity as it occurs. Sensor data describing these images or video are transmitted to a server or some other processor-based computing device that is accessible by the police (at the option of the owner of the ego vehicle 123A) or to the owner of the ego vehicle 123 (instead of, or in addition to, the police).

In yet another example of remedial action, the remote vehicles 123 that receive the BSM that the ego vehicle 123A is being subjected to criminal activity each transmit digital data to the owner of the ego vehicle 123A that indicates that causes the owner to receive a message indicating that the ego vehicle 123A is being subjected to criminal activity; this digital data may be transmitted via LTE or some other form of V2X communication having a range greater than DSRC (e.g., DSRC range). In some embodiments, this digital data is wirelessly transmitted to a DSRC-equipped roadside unit (RSU) which then relays the digital data to the owner of the ego vehicle 123A via LTE or some other form of V2X communication having a range greater than DSRC. In some embodiments, the digital data includes the sensor data describing the images or video of the criminal activity and graphical data for displaying a message describing the criminal activity. In some embodiments, the owner of the ego vehicle 123A is determinable, for example, based on a vehicle identification number (VIN) that is included in the BSM that is transmitted by the ego vehicle 123A (see, e.g., FIGS. 4 and 5 which depict the BSM data 195 as including such a unique identifier of the vehicle that transmits the BSM). For example, the deterrent system 199 includes a non-transitory memory that stores a data structure including a list of VINs and phone numbers for owners of the vehicles 123 described by the VINs, and the deterrent system 199 cross-references the VIN included in the BSM against this data structure to identify a phone number that is used to transmit a message via LTE that includes the digital data that notifies the owner of the criminal activity occurring in relation to their ego vehicle 123A.

The vehicles 123B, 123C . . . 123N include elements similar to the vehicle 123A, and so, those descriptions will not be repeated here.

The V2X-connected device 122 includes a smartphone, tablet computer, personal computer, roadside unit or some other processor-based computing device that includes the deterrent system 199. In some embodiments, the V2X-connected device 122 includes the V2X radio 144 of the deterrent system 199 but not the alarm system 143, and the V2X radio 144 includes one or more of the notification system 198 and the response system 197. In some embodiments, the V2X-connected device 122 is a DSRC-equipped device.

The functionality of the deterrent system 199 is described in more detail below according to some embodiments with reference to FIGS. 1B and 2-5.

Figure 1B:
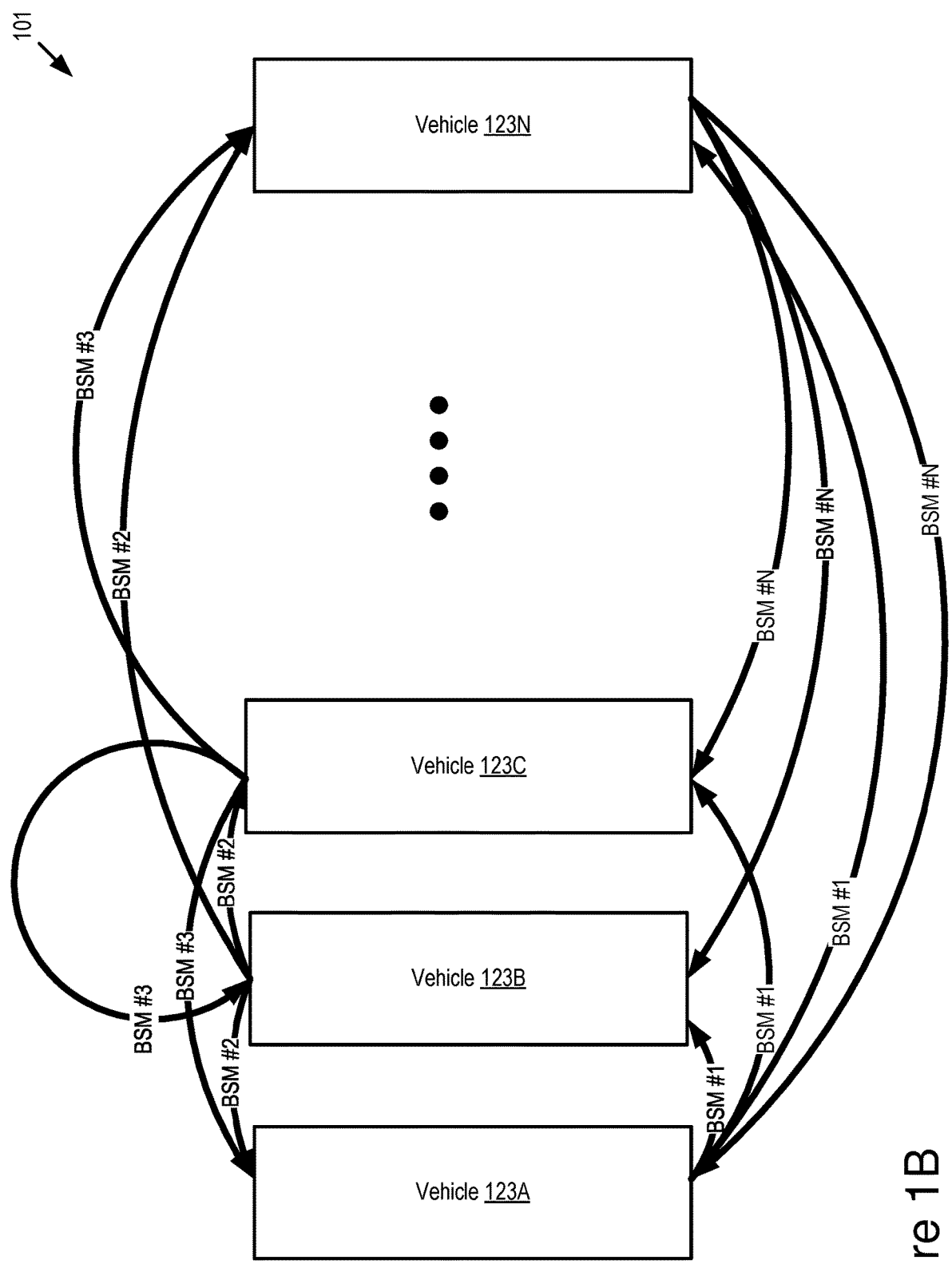
FIG. 1B is a block diagram illustrating an operating environment for a deterrent system according to some embodiments.

Referring now to FIG. 1B, depicted is an example operating environment 101 for the deterrent system 199 according to some embodiments. The operating environment 101 includes the vehicles 123 communicating with one another via the network 105. The arrows depicted in FIG. 1B illustrate V2X messages being communicated among the vehicles 123. In particular, FIG. 1B depicts the vehicles 123 engaging in BSM-based V2V communication. Each of the vehicles 123 includes the following elements: (1) a V2X radio 144; (2) an alarm system 143; and (3) a deterrent system 199. The V2X radio 144 includes the notification system 198 of the deterrent system 199. The alarm system 143 includes the response system 197 of the deterrent system 199. In some embodiments, both the notification system 198 and the response system 197 include software that provides the functionality of the deterrent system 199, and so, the V2X radio 144 and the alarm system 143 are conventional hardware components that have been modified in accordance with the deterrent system 199 so that these components can be manufactured cheaper and provide better operating performance relative to the operating performance of conventional versions of the V2X radio 144 and the alarm system 143.

The vehicles 123 included in the operating environment 101 are parked during off hours. Their ignition is off (i.e., disengaged) and their powertrain is not operating. Because these vehicles 123 each include a V2X radio 144 that is modified to include a notification system 198, they exchange a BSM at some regular interval even though their ignition is off (if they did not include the notification system 198, then they would not transmit any BSMs in this ignition off state because doing so would drain their batteries, which is not permissible under any manufacturing standard). The notification system 198 modifies the operation of the V2X radio 144 so that (1) the regular interval for transmitting BSMs when the ignition is off is once every three to five seconds [or some other time interval greater than 0.10 seconds]; and (2) the regular interval for transmitting BSMs when the ignition is on is once every 0.10 seconds.

The time interval for transmitting BSMs while the ignition is off is not a trivial matter; this time interval must be calibrated by the notification system 198 based on the current charge state of a battery system of the vehicle 123 so that the battery system is not depleted of voltage such that the vehicle 123 cannot be started. In some embodiments, the notification system 198 includes code and routines that are operable, when executed by an onboard vehicle computer of the vehicle 123, to cause the onboard vehicle computer to detect that the ignition of the vehicle 123 has been disengaged and, responsive to this event, take the following steps: determine the charge state of the battery system of the vehicle 123; and determine a regular interval for transmitting BSMs when the ignition of the vehicle 123 is off such that the functionality of the deterrent system 199 is provided without depleting the charge of the battery system of the vehicle 123 so that the vehicle 123. This interval may be different than once every three to five seconds.

Ordinarily an automobile design engineer would not think to configure a V2X radio 144 to transmit BSMs while the ignition of the vehicle 123 is disengaged because doing so would drain the battery system of the vehicle 123 to a point that is below that which is acceptable by modern design standards (i.e., the battery system must maintain sufficient charge to start the vehicle 123 even if the vehicle 123 not used for 14 days). However, the functionality of the notification system 198 described above solves this problem.

Example Computer System

Figure 2:
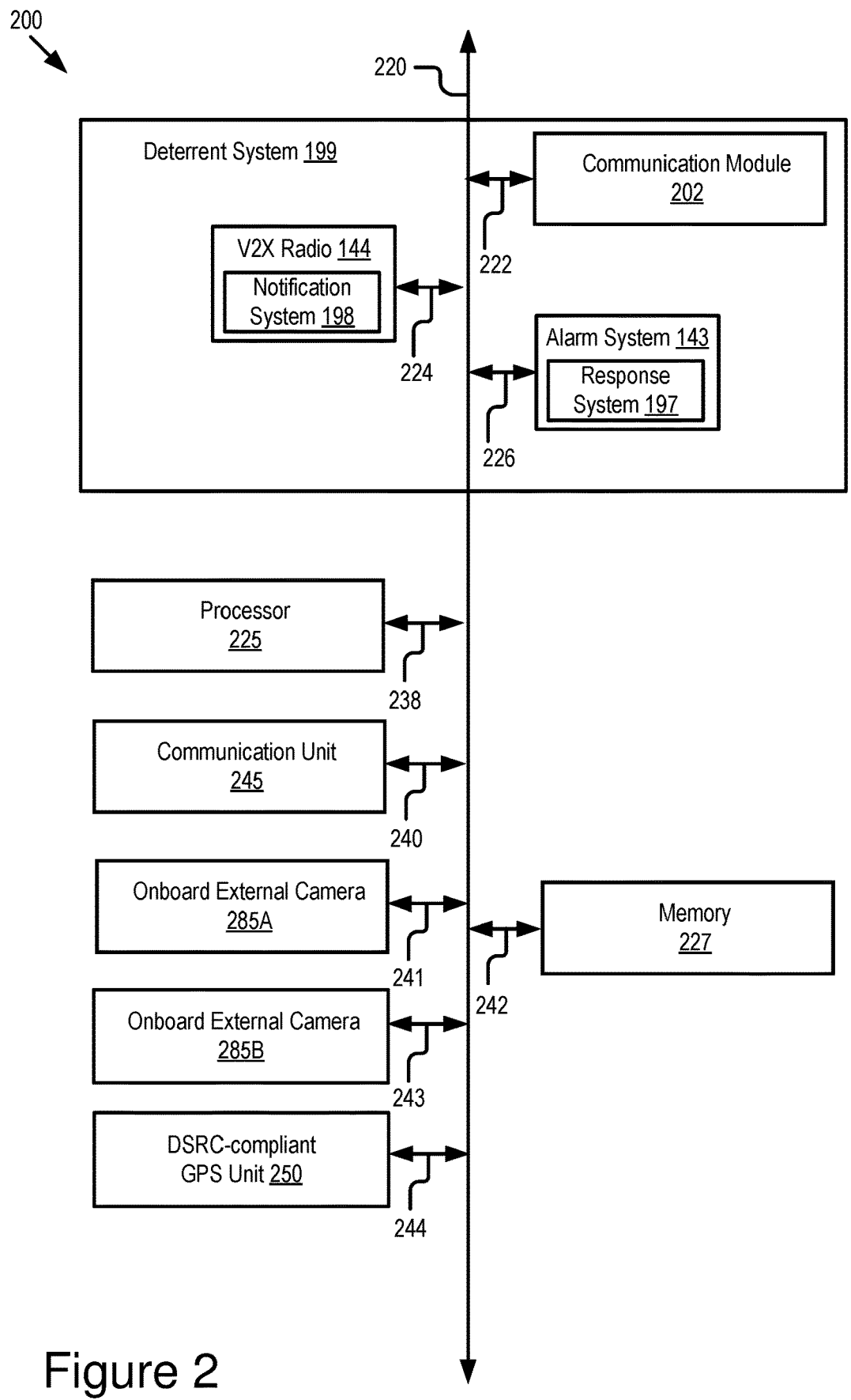
FIG. 2 is a block diagram illustrating an example computer system including the deterrent system according to some embodiments.

Referring now to FIG. 2, depicted is a block diagram illustrating an example computer system 200 including the deterrent system 199 according to some embodiments. In some embodiments, the computer system 200 may include a special-purpose computer system that is programmed to perform one or more steps of one or more of the method 300 described below with reference to FIGS. 3A and 3B. In some embodiments, the computer system 200 is an onboard vehicle computer of the vehicle 123. In some embodiments, the computer system 200 is an onboard unit of the vehicle 123. In some embodiments, the computer system 200 is an ECU, head unit or some other processor-based computing device of the vehicle 123.

The computer system 200 includes one or more of the following elements according to some examples: the deterrent system 199; a processor 225; a communication unit 245; a first onboard external camera 285A; a second onboard external camera 285B; a memory 227; and a DSRC-compliant GPS unit 250. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 240. The first onboard external camera 285A is communicatively coupled to the bus 220 via a signal line 241. The second onboard external camera 285B is communicatively coupled to the bus 220 via a signal line 243. The memory 127 is communicatively coupled to the bus 220 via a signal line 242. The DSRC-compliant GPS unit 150 is communicatively coupled to the bus 220 via a signal line 244.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The first onboard external camera 285A and the second onboard external camera 285B provides similar functionality as the onboard external camera 185 described above with reference to FIG. 1A, and so, that description will not be repeated here. The memory 227 provides similar functionality as the memory 127 described above with reference to FIG. 1A, and so, that description will not be repeated here. The DSRC-compliant GPS unit 250 provides similar functionality as the DSRC-compliant GPS unit 150 described above with reference to FIG. 1A, and so, that description will not be repeated here.

The memory 227 may store any of the data described above with reference to FIG. 1A or below with reference to FIGS. 2-5. The memory 227 may store any data needed for the computer system 200 to provide its functionality.

In the illustrated embodiment shown in FIG. 2, the deterrent system 199 includes: a communication module 202; the V2X radio 144; and the alarm system 143.

The communication module 202 can be software including routines for handling communications between the deterrent system 199 and other components of the operating environment 100 of FIG. 1A.

In some embodiments, the communication module 202 can be a set of instructions executable by the processor 225 to provide the functionality described below for handling communications between the deterrent system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 127. The communication module 202 may send or receive any of the digital data or messages described above with reference to FIG. 1A, or below with reference to FIGS. 2-5, via the communication unit 245.

In some embodiments, the communication module 202 receives data from components of the deterrent system 199 and stores the data in the memory 227 (or a buffer or cache of the memory 227, or a standalone buffer or cache which is not depicted in FIG. 2). For example, the communication module 202 receives the BSM data 195 from the communication unit 245 (which received the BSM data 195 as transmitted by a vehicle that is subject to criminal activity) and stores the BSM data 195 in the memory 227.

In some embodiments, the communication module 202 may handle communications between components of the deterrent system 199. For example, the communication module 202 transmits pings between the notification system 198 and the response system 197.

The V2X radio 144 and the alarm system 143 were described above with reference to FIGS. 1A and 1B, and so, those descriptions will not be repeated here.

In some embodiments, the notification system 198 can be stored in the memory 227 of the computer system 200 and can be accessible and executable by the processor 225. The V2X radio 144 (and the notification system 198 it includes) may be adapted for cooperation and communication with the processor 225 and other components of the computer system 200 via signal line 224.

In some embodiments, the response system 197 can be stored in the memory 227 of the computer system 200 and can be accessible and executable by the processor 225. The alarm system 143 (and the response system 197 it includes) may be adapted for cooperation and communication with the processor 225 and other components of the computer system 200 via signal line 226.

Example Processes

Figure 3A:
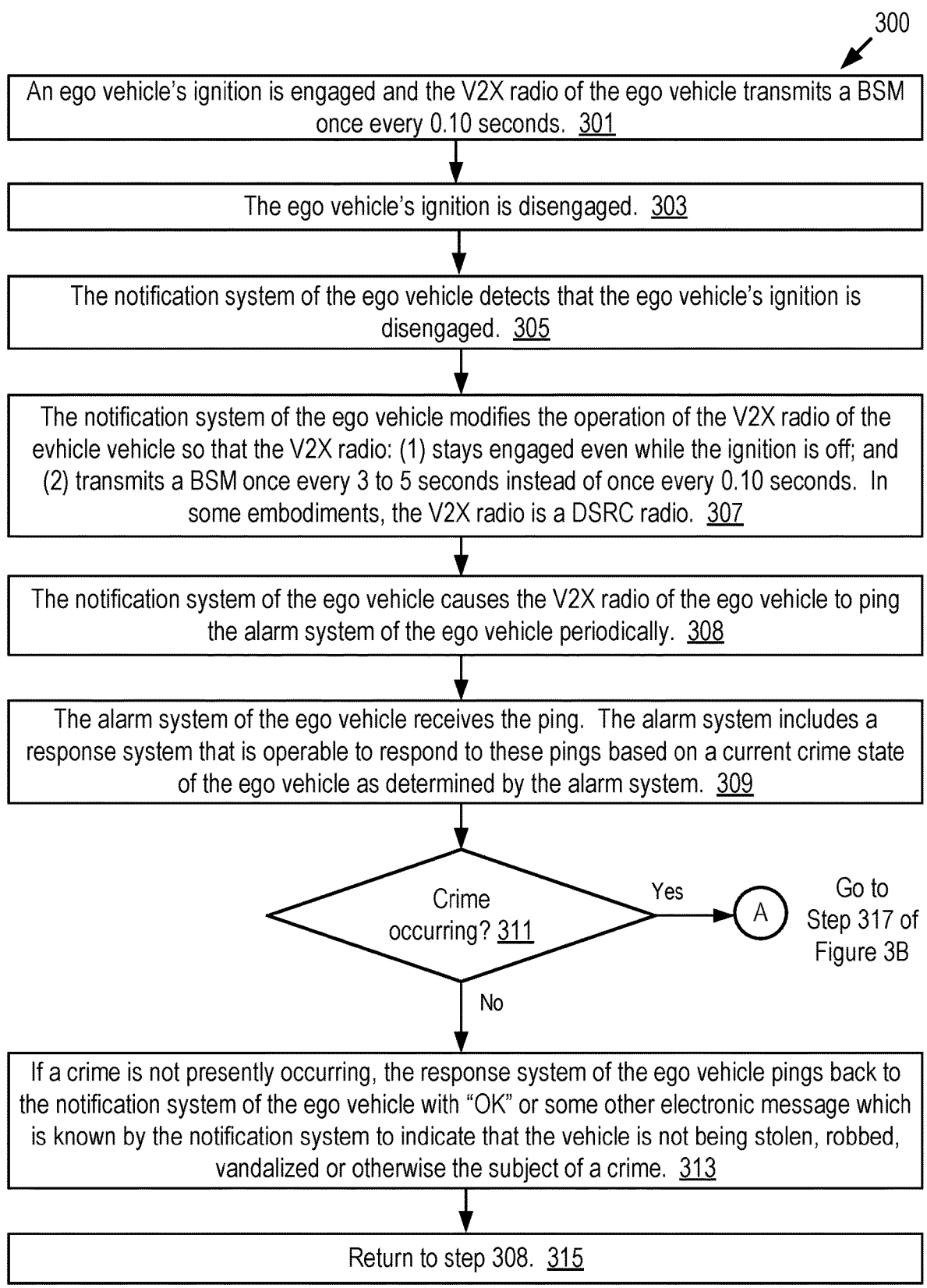
FIGS. 3A and 3B depict a method for deterring a criminal activity in relation to a connected vehicle according to some embodiments.
Figure 3B:
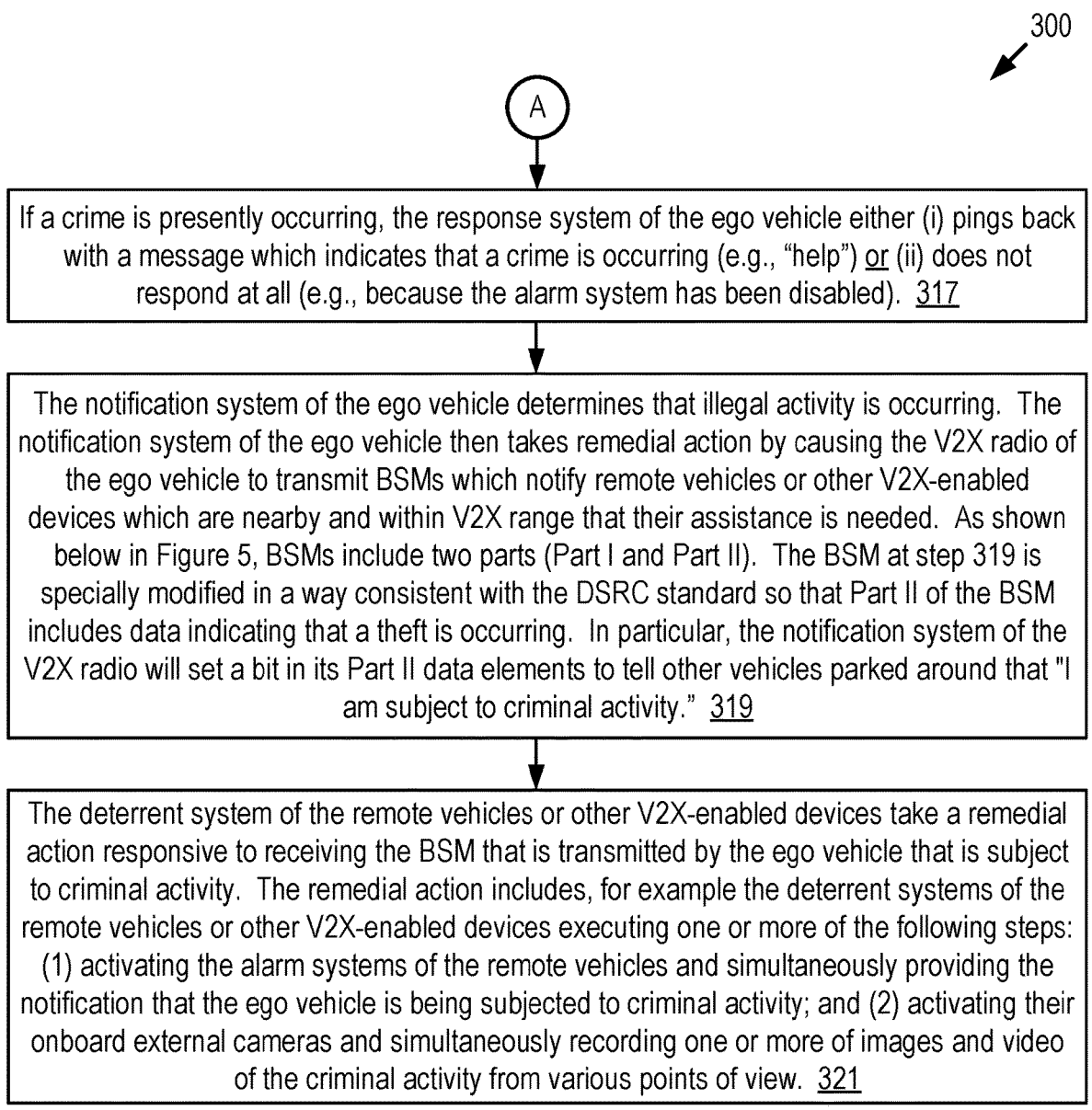

FIGS. 3A and 3B depicts a method 300 for deterring a criminal activity in relation to a connected vehicle using BSM-based V2X communications according to some embodiments. The steps of the method 300 are executable in any order, and not necessarily the order depicted in FIGS. 3A and 3B.

At step 301, an ego vehicle's ignition is engaged and the V2X radio of the ego vehicle transmits a BSM once every 0.10 seconds.

At step 303, the ego vehicle's ignition is disengaged.

At step 305, the notification system of the ego vehicle detects that the ego vehicle's ignition is disengaged.

At step 307, the notification system of the ego vehicle modifies the operation of the V2X radio of the ego vehicle so that the V2X radio: (1) stays engaged even while the ignition of the ego vehicle is off; and (2) transmits a BSM once every 3 to 5 seconds instead of once every 0.10 seconds. In some embodiments, the V2X radio is a DSRC radio.

At step 308, the notification system of the ego vehicle causes the V2X radio of the ego vehicle to ping the alarm system of the ego vehicle periodically.

At step 309, the alarm system of the ego vehicle receives the ping. The alarm system includes a response system that is operable to respond to these pings based on a current crime state of the ego vehicle as determined by the alarm system of the ego vehicle.

At step 311, a determination is made by the response system of the ego vehicle regarding whether a crime is presently occurring based on the current crime state of the ego vehicle. If the determination at step 311 is that a crime is presently occurring, then the method 300 proceeds to step 317 of FIG. 3B. If the determination at step 311 is that a crime is not presently occurring, then the method 300 proceeds to step 313 of FIG. 3A.

At step 313, the response system of the ego vehicle pings back to the notification system of the ego vehicle with "OK" or some other electronic message which is known by the notification system to indicate that the vehicle is not being stolen, robbed, vandalized or otherwise the subject of a crime.

At step 315, the method 300 returns to step 308.

Referring now to FIG. 3B, at step 317, the response system of the ego vehicle either (1) pings back with a message which indicates that a crime is occurring (e.g., "help") or (2) does not respond at all (e.g., because the alarm system has been disabled).

At step 319, the notification system of the ego vehicle determines that illegal activity is occurring. The notification system of the ego vehicle then takes remedial action by causing the V2X radio of the ego vehicle to transmit BSMs which notify remote vehicles or other V2X-enabled devices which are nearby and within V2X range that their assistance is needed. As shown below in FIG. 5, BSMs include two parts (Part I and Part II). The BSM at step 319 is specially modified in a way consistent with the DSRC standard so that Part II of the BSM includes data indicating that a theft is occurring. In particular, the notification system of the V2X radio will set a bit in its Part II data elements to tell other vehicles parked around that "I am subject to criminal activity."

At step 321, the deterrent system of the remote vehicles or other V2X-enabled devices take a remedial action responsive to receiving the BSM that is transmitted by the ego vehicle that is subject to criminal activity. The remedial action includes, for example the deterrent systems of the remote vehicles or other V2X-enabled devices executing one or more of the following steps: (1) activating the alarm systems of the remote vehicles and simultaneously providing the notification that the ego vehicle is being subjected to criminal activity; and (2) activating their onboard external cameras and simultaneously recording one or more of images and video of the criminal activity from various points of view.

Referring now to FIG. 4, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints. In some embodiments, one or more of the vehicles 123A, 123B, 123C . . . 123N depicted in FIG. 1A and the V2X-connected device 122 depicted in FIG. 1A are DSRC-equipped endpoints.

Referring now to FIG. 5, depicted is a block diagram illustrating an example of BSM data 195 according to some embodiments.

A BSM may include two parts. These two parts may include different BSM data 195 as shown in FIG. 5.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
transmitting, by a first Vehicle-to-Anything (V2X) radio of a first connected vehicle to a second connected vehicle, a first wireless message, wherein the first V2X radio is powered on while an ignition of the first connected vehicle is disengaged and responsive to the ignition being disengaged switching from a first transmission rate to a second transmission rate to prevent battery drainage and wherein the second transmission rate is less frequent than the first transmission rate;
determining, based on a payload of the first wireless message, whether the first connected vehicle is being subjected to criminal activity;
responsive to determining that the first connected vehicle is being subjected to criminal activity, taking a remedial action that includes triggering an alarm system of the second connected vehicle so that the alarm system provides a warning notification that the first connected vehicle is being subjected to criminal activity;
and transmitting, to the second connected vehicle, a disengagement notification that states that the first connected vehicle is going to disengage, wherein the disengagement notification is trigged by a low battery level.

2. The method of claim 1, wherein the first transmission rate is once every 0.10 seconds and the second transmission rate is once every three to five seconds.

3. The method of claim 1, wherein the disengagement notification is part of a basic safety message.

4. The method of claim 1, wherein the first connected vehicle is an autonomous vehicle.

5. The method of claim 1, wherein the warning notification includes one or more of honking a horn or flashing headlamps.

6. The method of claim 1, wherein a group of second connected vehicles receive the first wireless message such that the group of second connected vehicles activate their alarm systems and simultaneously provide the warning notification that the first connected vehicle is being subjected to criminal activity.

7. The method of claim 1, wherein the first connected vehicle is parked and an ignition of the first connected vehicle is disengaged.

8. The method of claim 1, wherein the remedial action further includes activating one or more onboard external cameras of the first connected vehicle so that one or more of images and video of the criminal activity are recorded.

9. The method of claim 1, wherein a group of second connected vehicles receive the first wireless message such that the group of second connected vehicles activate their onboard external cameras and simultaneously record one or more of images and video of the criminal activity from various points of view.

10. The method of claim 8, wherein the one or more of the images and the video are wirelessly transmitted to a third connected device that is operated by a law enforcement agency.

11. The method of claim 1, wherein the remedial action further includes displaying a warning message indicating that the first connected vehicle is being subjected to criminal activity or one or more images of the criminal activity.

12. A system comprising:
a processor communicatively coupled to a first Vehicle-to-Anything (V2X) radio of a first connected vehicle and non-transitory memory, wherein the first V2X radio is operable to transmit a first wireless message to a second connected vehicle, the first V2X radio is powered on while an ignition of the first connected vehicle is disengaged and responsive to the ignition being disengaged switching from a first transmission rate to a second transmission rate to prevent battery drainage, the second transmission rate is less frequent than the first transmission rate, and the non-transitory memory stores computer code that is operable, when executed by the processor, to cause the processor to:
determine, based on a payload of the first wireless message, that the first connected vehicle is being subjected to criminal activity;
responsive to determining that the first connected vehicle is being subjected to criminal activity, take a remedial action that includes triggering an alarm system of the second connected vehicle so that the alarm system provides a warning notification that the first connected vehicle is being subjected to criminal activity;
and transmit, to the second connected vehicle, a disengagement notification that states that the first connected vehicle is IP-A-3443 going to disengage, wherein the disengagement notification is trigged by a low battery level.

13. The system of claim 12, wherein the first connected vehicle is an autonomous vehicle.

14. The system of claim 12, wherein the first transmission rate is once every 0.10 seconds and the second transmission rate is to once every three to five seconds.

15. The system of claim 12, wherein a group of second connected vehicles receive the first wireless message such that the group of second connected vehicles activate their alarm systems and simultaneously provide the warning notification that the first connected vehicle is being subjected to criminal activity.

16. The system of claim 13, wherein the first connected vehicle is parked and an ignition of the first connected vehicle is disengaged.

17. The system of claim 12, wherein the remedial action further includes activating one or more onboard external cameras of the first connected vehicle so that one or more of images and video of the criminal activity are recorded.

18. The system of claim 12, wherein a group of second connected vehicles receive the first wireless message such that the group of second connected vehicles activate their onboard external cameras and simultaneously record one or more of images and video of the criminal activity from various points of view.

19. The system of claim 18, wherein the remedial action further includes displaying a warning message indicating that the first connected vehicle is being subjected to criminal activity or one or more images of the criminal activity.

20. A non-transitory computer program product comprising instructions that, when executed by one or more processors, cause the one or more processors to perform operations comprising:
  instructing a first Vehicle-to-Anything (V2X) radio of a first connected vehicle to transmit a first wireless message to a second connected vehicle, wherein the first V2X radio is powered on while an ignition of the first connected vehicle is disengaged and responsive to the ignition being disengaged switching from a first transmission rate to a second transmission rate to prevent battery drainage and wherein the second transmission rate is less frequent than the first transmission rate;
  determining, based on a payload of the first wireless message, that the first connected vehicle is being subjected to criminal activity;
  responsive to determining that the first connected vehicle is being subjected to criminal activity, taking a remedial action that includes triggering an alarm system of the second connected vehicle so that the alarm system provides a warning notification that the first connected vehicle is being subjected to criminal activity;
  and transmitting, to the second connected vehicle, a disengagement notification that states that the first connected vehicle is going to disengage, wherein the disengagement notification is trigged by a low battery level.

* * * * *